US006418889B1

(12) United States Patent
Manabe et al.

(10) Patent No.: US 6,418,889 B1
(45) Date of Patent: Jul. 16, 2002

(54) CLOSED DECK TYPE CYLINDER BLOCK AND METHOD FOR PRODUCING THE SAME

(75) Inventors: Tatsuya Manabe; Shin Nitta, both of Fuchu; Fumiyuki Ogawa; Hiroshi Furusawa, both of Aichi-ken, all of (JP)

(73) Assignees: Ryobi Ltd., Hiroshima-Ken; Asahi Organic Chemical Industry Co., LTD, Miyazaki-Ken, both of (JP)

( * ) Notice: Subject to any disclaimer, the term of this patent is extended or adjusted under 35 U.S.C. 154(b) by 0 days.

(21) Appl. No.: 09/777,677

(22) Filed: Feb. 7, 2001

(51) Int. Cl.[7] .................................................. B23P 17/00

(52) U.S. Cl. ................................ 123/41.74; 29/888.061

(58) Field of Search .................. 123/41.74; 29/888.061

(56) References Cited

U.S. PATENT DOCUMENTS

| | | | | |
|---|---|---|---|---|
| 3,754,945 A | | 8/1973 | Moore, Jr. | 106/38.35 |
| 4,831,712 A | | 5/1989 | Suzuki et al. | 29/527 |
| 4,844,144 A | | 7/1989 | Murphy et al. | 164/35 |
| 5,720,334 A | * | 2/1998 | Usui et al. | 164/340 |

FOREIGN PATENT DOCUMENTS

| | | | |
|---|---|---|---|
| DE | 42 30 596 A1 | 3/1994 | B22D/19/16 |
| EP | 0 465 947 A1 | 1/1992 | B22D/17/24 |
| EP | 0 788 855 A1 | 8/1997 | B22D/17/24 |
| JP | 2000-199452 | 7/2000 | F02F/1/10 |
| WO | 90/02007 | 3/1990 | B22C/1/20 |

OTHER PUBLICATIONS

Patent Abstracts of Japan 2000–199452, Jul. 18, 2000.
International Search Report.

* cited by examiner

*Primary Examiner*—Tony M. Argenbright
*Assistant Examiner*—Katrina B. Harris
(74) *Attorney, Agent, or Firm*—Sughrue Mion, PLLC

(57) ABSTRACT

A closed deck type cylinder block providing an optimum area ratio of opening at a top deck side, and a method for producing such cylinder block having the reduced area ratio of the opening at a reduced energy cost and with reduced labor, yet exhibiting smooth discharge of waste sand converted from a water jacket core through the opening in spite of the reduced area ratio of the opening. The cylinder block is formed with a plurality of cylinders juxtaposedly arranged to each other and a water jacket portion surrounding the cylinders. An upper end of the water jacket portion is open at a top deck and is partly covered with bridge portions. The opening has an area ratio of from 10 to 30% of a projection area of the water jacket portion at the top deck surface.

9 Claims, 4 Drawing Sheets

CLOSED DECK TYPE CYLINDER BLOCK AND METHOD FOR PRODUCING THE SAME

BACKGROUND OF THE INVENTION

The present invention relates to a closed deck type cylinder block and a method for producing the block, and more particularly to the closed deck type cylinder block having a reduced open area ratio of an opening of a water jacket portion opened at a top deck side of the cylinder block, and method for producing such cylinder block with the reduced open area ratio.

In the cylinder block for a vehicle, a water jacket is formed surrounding a plurality of cylinders arranged juxtaposedly. The water jacket has an upper open end opening at the top deck surface of the cylinder block. In a closed deck type cylinder block, the upper open end of the water jacket is partly covered with bridges, and in an open deck type cylinder block, no bridge is provided at the opening. Recently, attention is drawn to the closed deck type cylinder block with a reduced opening area ratio at the top deck surface because of the requirement of high output and noise reduction of an engine. Such cylinder block can provide high rigidity and reduced vibration, which improves engine performance and meets with environmental demand.

According to a conventional method for die casting the cylinder block of this type, a coated core for forming a water jacket portion (hereinafter simply referred to as "water jacket core") is assembled in a metal mold, and a molten light metal such as molten aluminum alloy is injected into the metal mold at low speed with a plunger speed of not more than 0.5m/sec. to provide a laminar flow of the molten metal. The casted product (cylinder block) is then subjected to shaking treatment and if necessary, heat treatment, to remove wasted core sands through the opening at the top deck surface. The resultant product provides high rigidity and does not involve blisters which may be formed due to heat treatment (for example, heat treatment to the casted product containing the core) to the casted product produced through high speed injection (turbulent flow).

After casting, shaking treatment or heat treatment is performed to fractionate the wasted core sand so as to discharge the wasted core sand through the opening of the water jacket portion. For example, if a core contains an easily thermaly decomposable and curable organic binder, which comprises as the main component, polyfunctional acrylamide having at least two ethylenically unsaturated groups in one molecule as disclosed in international publication No. WO 90/02007, the wasted core sand is discharged by way of the shaking treatment.

In the closed deck type cylinder block, the increase in occupying ratio of the bridge portions with respect to the opening of the water jacket implies reduction in an area ratio of the opening with respect to a projection area of the water jacket portion at the top deck side, the projection being made in an axial direction of the cylinders. Therefore, the waste sand discharge through the opening becomes more difficult. In other words, the requirement of reduction in the opening area ratio is in direct conflict with the requirement of enhancing the removal of the waste sand through the opening. Consequently, optimum area ratio of the opening of the water jacket must be selected in the closed deck type cylinder block.

Further, if a difficulty thermally decomposable phenolic resin is used as a curable organic binder in the production of the water jacket core, both shaking and heat treatment are required, which incurs greater energy cost and labor. Furthermore, in case of the water jacket core produced by the materials described in international publication No. WO 90/02007, great amount of heat from the molten metal is transmitted to the water jacket core if the sand/metal ratio (weight ratio of the core to the molten metal) is low. Therefore, in accordance with the progress of thermal decomposition, tar is generated and the viscosity of the tar will degrade the removability of the waste sand from the water jacket portion.

SUMMARY OF THE INVENTION

It is therefore an object of the present invention to provide a closed deck type cylinder block providing an optimum area ratio of the opening of the water jacket portion with respect to the projection area of the water jacket portion at the top deck side.

Another object of the present invention is to provide a method for producing a closed deck type cylinder block capable of providing an extremely low area ratio of opening ranging from 10 to 30% of the projection area of the water jacket at the top deck side in a die-casting method employing a coated water jacket core, yet capable of providing excellent waste sand discharging performance while reducing energy cost and labor for the production.

These and other objects of the present invention will be attained by a closed deck type cylinder block having a top deck surface and formed with a plurality of cylinders juxtaposedly arranged to each other and a water jacket portion surrounding the plurality of cylinders, the water jacket portion having an opening opened at the top deck surface of the cylinder block, and the opening being partly closed by bridge portions. The opening has an area ratio of from 10 to 30% of a projection area of the water jacket portion at the top deck surface.

By setting the area ratio of opening not less than 10%, a resultant cylinder block can provide a smooth discharge of the waste sand converted from the water jacket core through the opening, and inadvertent increase in hydraulic pressure of a coolant in the water jacket can be avoided, thereby avoiding inadvertent breakdown of a feed pump for feeding the coolant. Further, by setting the area ratio of opening not more than 30%, sufficient mechanical strength of the cylinder block can be provided to enhance engine performance and to enhance silence of the operating engine.

In another aspect of the invention, there is provided a method for producing the above described closed deck type cylinder block. The method includes the steps of: molding a water jacket core with a mold material with the free flowability comprising a refractory aggregate, a curable organic binder containing as a requisite component polyfunctional acrylamide having at least two ethylenically unsaturated groups in one molecule, and at least one metal oxide selected from the group consisting of iron oxide and copper oxide; forming a coating layer over the molded water jacket core;

Setting the coated water jacket core in a metal mold and injecting a molten metal into the metal mold to produce a cylinder block product by die-casting; and discharging waste sand converted from the water jacket core from the cylinder block product only by shaking the cylinder block product.

Because the water jacket core is molded with using the curable organic binder containing polyfunctional acrylamide as a requisite component and the specific metal oxide, and because the molded core is subjected to coating, a complete discharge of the waste sand after casting can be performed only by shaking the cylinder block product, even if the resultant closed deck type cylinder block has a small opening area ratio such as from 10 to 30% of the projection area of the water jacket portion at the top deck surface. Particularly, in case of the co-use of the curable organic binder containing polyfunctional acrylamide and iron oxide or a mixture of iron oxide and copper oxide, tar generated at the thermal decomposition of the curable organic binder can be reduced. Accordingly, waste sand discharging performance can further be improved after casting, and only shaking process is required for completely discharging the waste sand from the cylinder block product. Thus, entire processing period can be reduced, and productivity can be enhanced.

DETAILED DESCRIPTION OF THE PREFERRED EMBODIMENTS

Figure 1:
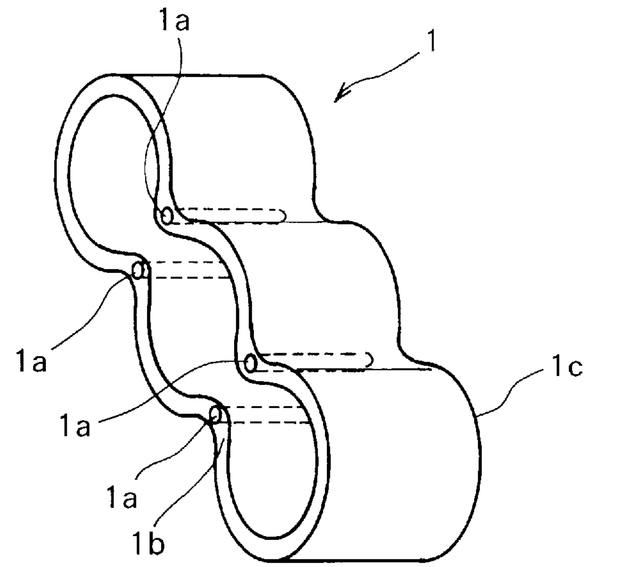
FIG. 1 is a perspective view showing a water jacket core used for casting the closed deck type cylinder block according to one embodiment of the present invention.

A method for producing a closed deck type cylinder block according to one embodiment of the present invention will be described.

Refractory aggregate and curable organic binder are used as components of the water jacket core for producing the closed deck type cylinder block. Any kind of the curable organic binder is available as long as the binder binds together the refractory aggregates by curing upon chemical reaction with or without a curing agent, and the binder can make a mold material(water jacket core material) with the free flowability. Typical binder is phenol resin, epoxy resin, urea resin, melamine resin, unsaturated polyester resin, diarylphthalate resin, and polyfunctional acrylamide. Only one kind or at least two kinds of binders can be used. The amount of the binder is determined in light of the kind of the refractory aggregate, kind of binder, required bending strength of the mold material, and discharging performance of the waste sand after casting. Generally, from 0.5 to 10 parts by weight of binder is preferable with respect to 100 parts by weight of refractory aggregate, and more preferably from 1 to 3 parts by weight.

Among the above listed binders, the binder containing polyfunctional acrylamide as requisite component (hereinafter simply referred to as "polyfunctional acrylamide binder") is the most preferable binder in view of the discharging characteristic of waste sand. Generally, not less than 10 wt % of polyfunctional acrylamide is contained in the binder. From 30 to 90 wt % of polyfunctional acrylamide is preferable in view of the humidity resistance of the mold material. From 40 to 80 wt % is more preferable. If the content of the polyfunctional acrylamide is less than 10 wt %, curing nature of the core will be deteriorated. Acrylamide, N-methylolacrylamide, and other polymeric compound and/or epoxy resin, urea resin, or melamine resin other than the above described unsaturated polyester resin and diarylphthalate resin can be used in combination with the polyfunctional acrylamide binder in accordance with an intended subject such as cost reduction and improvement on quality e.g., strength of the resultant core and humidity resistance, as long as the fundamental quality of the water jacket core, such as discharging characteristic of the waste sand after casting and a good free flowability of the mold material is not degraded.

The polyfunctional acrylamide contains not less than two unsaturated ethylene groups in the molecule. Typical example is methylene-bis-acrylamide, ethylene-bis-acrylamide, methylene-bis-methacrylamide, oxydimethylene-bis-acrylamide, ethylenedioxybis-N-methyleneacrylamide and a mixture thereof. These polyfunctional acrylamide are produced by a reaction of the following reaction materials (1) through (3) with the addition of oxygen catalyst and polymerization inhibitor and by heating at a temperature ranging from 30 to 100° C. for about 1 to 24 hours while preferably blowing air at a decompressed condition. During this reaction, generated water and alcohol are removed by distillation:

(1) Reaction of acrylamide (for example, acrylamide or methacrylamide) with at least one of the materials selected from the group consisting of N-methylolacrylamide (for example, N-methylolacrylamide or N-methylolmethacrylamide), and N-alkoxymethylacrylamide(for example, N-methoxymethylacryl-amide or N-methoxymethylmethacrylamide)

(2) N-methylolacrylamide itself:

(3) Reaction of N-methylolacrylmide with N-alkoxymethylacrylamide: The thermally decomposable polyfunctional acrylamide binder is preferably co-used with at least one metal oxide selected from the group consisting of iron oxide and copper oxide in order to reduce tar which may be generated during casting and to further improve discharging performance of the waste sand. Not less than 10 parts by weight of metal oxide, preferably from 30 to 70 parts by weight, should be contained in the 100 parts by weight of the polyfunctional acrylamide binder.

Turning to the refractory aggregate, any kind of aggregate is available as long as the aggregate provides sufficient refractory nature and proper particle size and particle distribution when constituting a base material of the water jacket core. Typical refractory aggregate is specific sand such as silica sand, olivine sand, zircon sand, chromite sand, and alumina sand, or slag particles such as ferrochromium slag, ferronickel slag, and converter slag or porous particles such as NAIGAI CERABEADS (product supplied by Naigai Ceramics) or reproduced sand. Only one kind of the sands or a mixture thereof can be used.

In addition to the above described components, is available as a material of the water jacket core a polymerization accelerator which accelerates curing reaction (addition polymerization reaction) such as silane coupling which is used as a radical polymerization initiator an a coupling agent which can further improve strength.

A conventional molding method can be used such as hot mulling method, semi-hot mulling method, and cold mulling method for molding the water jacket core with the above described binder, the refractory aggregate and other selected component. However, the cold marling method is preferable if polyfunctional acrylamide binder is used taking the degradation of the core due to thermal polymerization (curing reaction) into consideration.

Next, will be described with reference to FIGS. 1 through 6 a method for producing a V6 engine cylinder block to which the method for producing a closed deck type cylinder block according to the present embodiment is applied. The V6 engine block has an upper V-shaped bank and three cylinders are arrayed side by side to totally provide V-shape with the six cylinders.

The mold material is blow molded in a metal mold pre-heated at the temperature of from 250 to 30° C. and then cured for a predetermined period. A resultant water jacket core 1 is shown in FIG. 1 in which a plurality of holding bores 1*a* are formed in an axial direction of the cylinder The thus shaped core 1 correspond to the contour of a water jacket surrounding three cylinders of the V6 cylinder block The holding bores 1*a* are formed so as to allow complementary holding pins 3*b* to be inserted thereinto in order to hold the water jacket core 1 at a correct position in a metal mold when casting the cylinder block.

The molded water jacket core 1 is subjected to coating so that the core can provide a sufficient resistance against casting pressure, and so that the metal penetration into the core can be restrained, and so that the resultant water jacket can have a smooth surface. Incidentally, there is no specific requirement in terms of kind of coating materials, coating method, coating times, drying condition and a thickness of a coating layer.

A coating process will be described. The water jacket core 1 molded in a manner described above is dipped into a first coating liquid shown in Table 1 below to form a first coating layer over the core 1. In the dipping, the open ends of the holding bores 1 are sealed with a proper member or are mechanically plugged with jigs so as to prevent the coating liquid from entering into the holes 1*a*. After dipping, the core 1 is heated at a temperature of 80 to 100° C. for about 15 to 30 minutes for semi-drying the first coating layer. After the formation of the first coating layer, the core 1 is dipped into a second coating liquid shown in Table 1 below to form a second coating layer over the first coating layer. After dipping, the core 1 is heated at a temperature of 160 to 180° C. for about 15 to 30 minutes for drying the second coating layer. Thus, the water jacket core 1 coated with the first and second coating layers can be provided.

TABLE 1

| COMPONENTS | FIRST COATING LAYER | | SECOND COATING LAYER | |
|---|---|---|---|---|
| SOLVENT | WATER | 20 PARTS BY WEIGHT | WATER | 20 PARTS BY WEIGHT |
| AGGREGATE | ZIRCON FLOUR | 100 PARTS BY WEIGHT | NATURAL MICA | 20 PARTS BY WEIGHT |
| BINDER | UREA RESIN | 3.2 PARTS BY WEIGHT | ARTIFICIAL MICA | 10 PARTS BY WEIGHT |
| ADDITIVE | SURFACE ACTIVE AGENT | 0.2 PARTS BY WEIGHT | SURFACE ACTIVE AGENT | 0.25 PARTS BY WEIGHT |
| | ANTIFOAMING AGENT | SMALL AMOUNT | ANTIFOAMING AGENT | SMALL AMOUNT |

The first coating layer includes a high hardness film capable of withstanding high casting pressure, and the second coating layer includes piled ramentum or flaky segments so as to avoid penetration of molten aluminum alloy into the water jacket core. Further, in the coating process, since the second coating layer is coated on the insufficiently dried first coating layer, the aqueous urea resin contained in the first coating layer is penetrated into the second coating layer to create a diffusion layer, so that the first and second coating layers can be firmly bonded together. Thickness of the first and second coating layers is from about 0.2 to 0.4 mm, and from about 0.1 to 0.2 mm, respectively. Incidentally, the thickness control is made by controlling pH and water content with respect to the first and second coating layers, respectively. The thus coated water jacket core is set in a die-casting machine shown in FIGS. 2 through 5 for casting V6 cylinder block.

Figure 2:
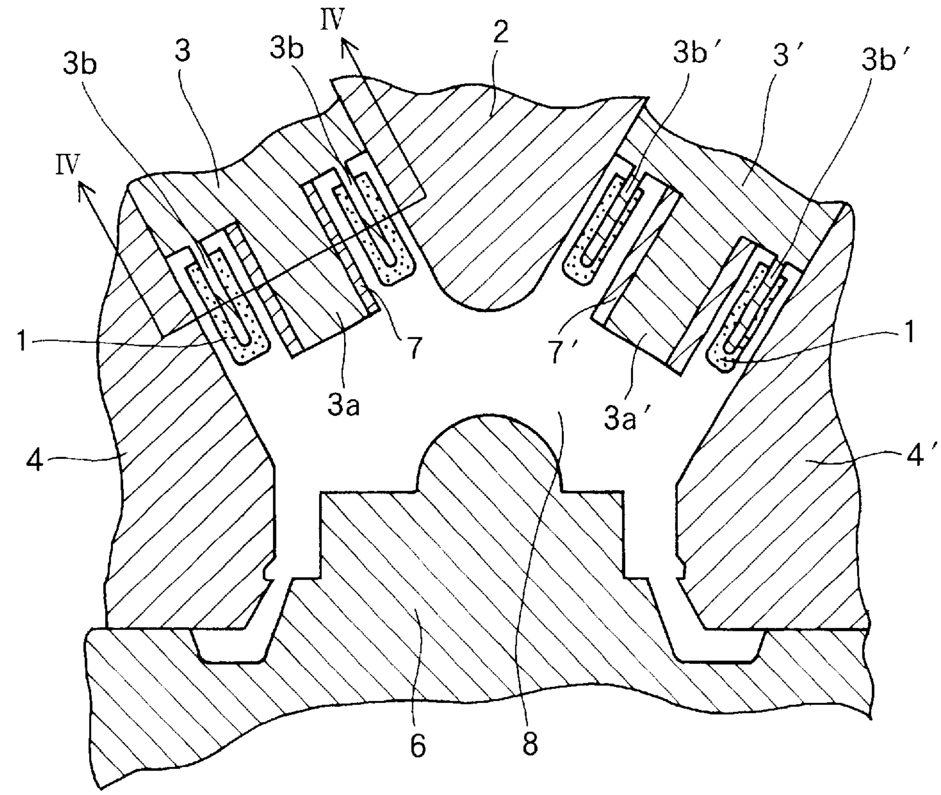
FIG. 2 is a cross-sectional view showing a metal mold clamping state in a die-casting apparatus and the water jacket core set therein used for producing the closed deck type cylinder block according to the embodiment.
Figure 3:
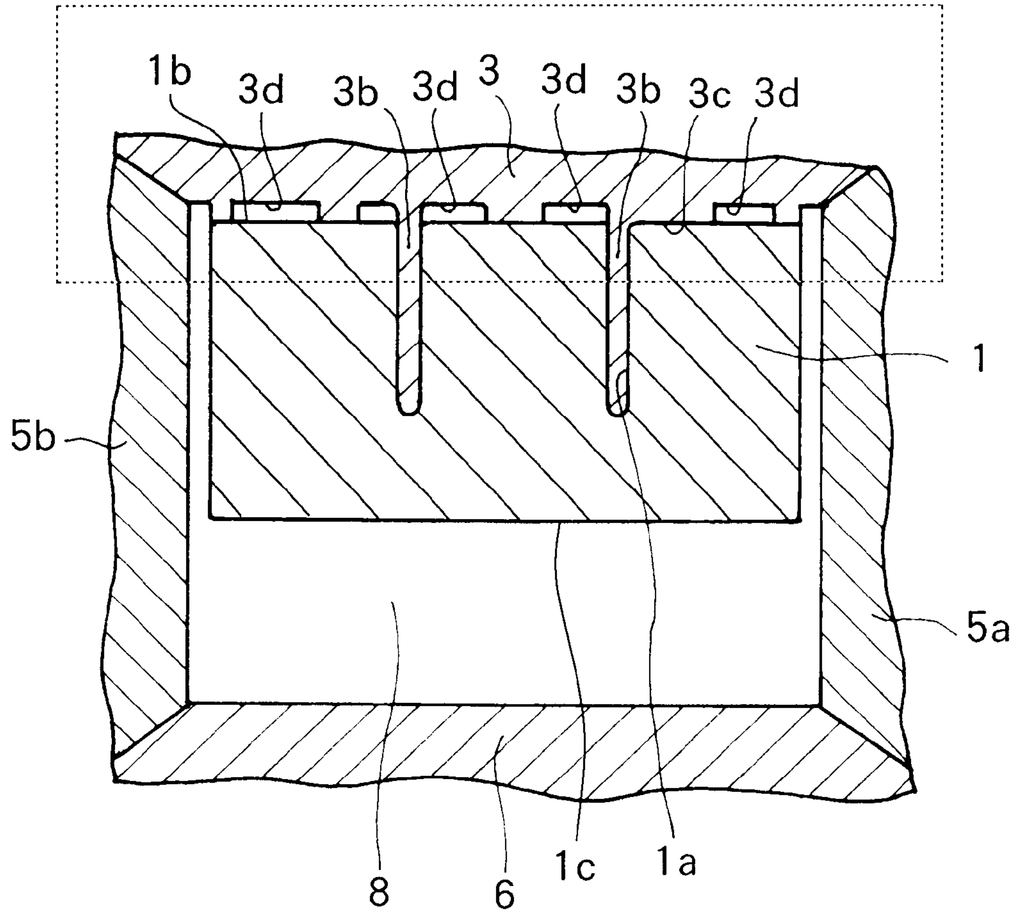
FIG. 3 is a cross-sectional view taken along the line III—III of FIG. 4 for particularly showing the metal mold including a slide core and the water jacket core held by the slide core.
Figure 4:
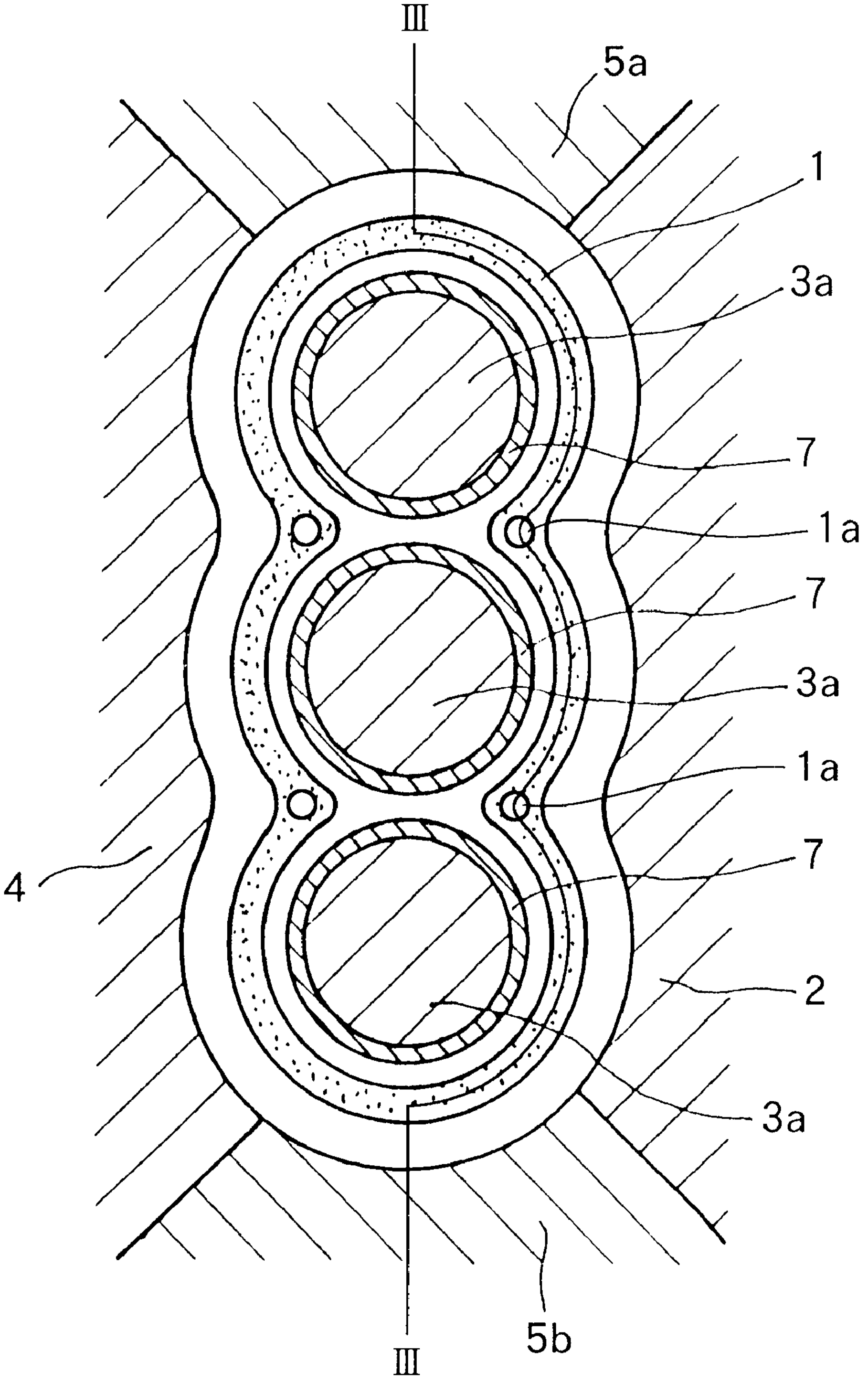
FIG. 4 is a cross-sectional view taken along the line IV—IV of FIG. 2 for particularly showing the metal mold clamping state in the die-casting apparatus and the water jacket core set therein.
Figure 5:
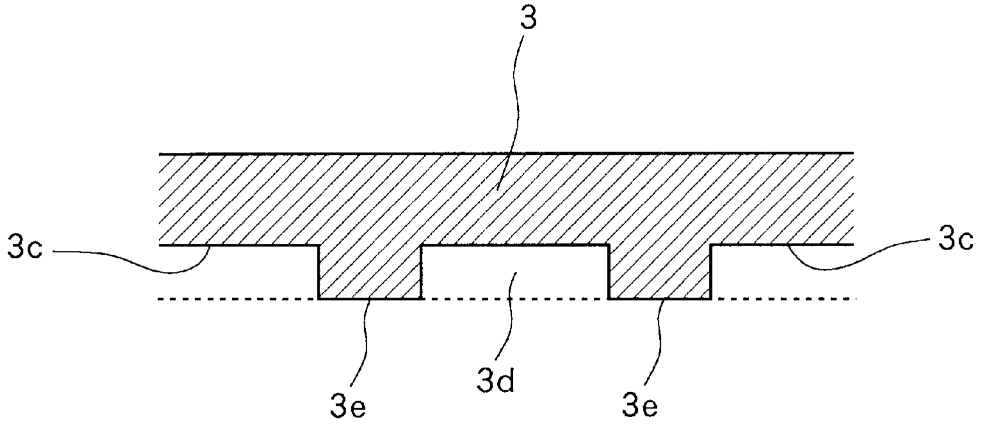
FIG. 5 is an enlarged cross-sectional view showing a part of FIG. 3.

As best shown in FIG. 2, a pair of slide cores 3, 3' are provided at both sides of a movable die 2. A pair of first slide cores 4, 4' and a pair of second slide cores 5, 5' (FIG. 3) are provided around the slide cores 3, 3'. A combination of these slide cores and a fixed core 6 defines an outer contour of the cylinder block. Incidentally, the following description merely pertains to the half part of the cylinder block defining three cylinders. A solid cylindrical protrusion 3*a* for mounting thereover cylinder liner 7 extends from the slide core 3. Further, water jacket core holding pins 3*b* engageable with the holding bores 1*a* of the core 1 also extend from the slide core 3 in an axial direction of the cylinder liners 7 toward a mold cavity 8. The slide core. 3 has an abutting surface 3*c* in confrontation with a front end face 1*b* of the water jacket core 1, and the abutting surface 3*c* is formed with a plurality of recesses 3*d*. The abutting surface 3*c* defined between the neighboring recesses 3*d* serves as front end abutting surface 3*e* (FIG. 5).

In a clamping state of the metal mold, the coated water jacket core 1 is held at a stable position within the mold cavity 8 such that the front end face 1*b* of the water jacket core 1 is in intimate contact with the front end abutting surface 3*e* of the slide core 3 without any gap, and at the same time, the core holding pins 3*b* are insertedly engaged with the holding bores 1*a* of the 1.

With this state, upon filling the molten light metal such as molten aluminum alloy into the mold cavity 8, the forward displacement of the coated water jacket core 1 in the axial direction of the cylinder liner 7 is limited upon abutment of the front end face 1*b* with the front end abutting surface 3*e*. On the other hand, the rearward displacement of the coated water jacket core within the mold cavity 8 is not mechanically limited. However, the water jacket core 1 is urged toward the front end abutting surface 3*e* because the molten metal pressure applied to a rear end surface 1*c* of the water jacket core 1 is far greater than the molten metal pressure applied to the front end surface 1*b*. Thus, positioning of the water jacket core 1 is provided by the molten metal pressure, which renders a core print unnecessary. Further, bridge portions are formed upon filling the molten metal into the spaces defined between the recessed portion 3*d* of the slide core 3 and the front end face 1*b* of the water jacket 1. On the other hand, intimate contacting portions between the front end face 1*b* and the front end abutting surface 3*e* will become an open end of the water jacket opening at the top deck surface of the cylinder block.

Incidentally, each holding pin 3*b* is formed with a gas vent passage open to its outer peripheral surface as a gas vent opening so as to discharge gas generated from the coated water jacket core 1. To this effect, each pin 3*b* has a hollow shape in communication with the gas vent opening. Further, the gas vent opening can be positioned to a tip end of the pin 3*b*, or can be positioned other than the tip end. Forcible gas vent can be performed, if desired.

Here, most importantly, the total area of the front end abutting surface 3*e* of the slide core 3 is determined such that area ratio of the opening of the water jacket to the projection area of the water jacket at the top deck side is in the range of from 10 to 30% as a result of casting (the shape of the projection area corresponds to a shape of the front end face 1*b* of the water jacket core). The area ratio should be not less than 10% otherwise hydraulic pressure of the coolant in the water jacket is inevitably increased to destroy a coolant feed pump, and waste sand cannot be smoothly discharged out of the opening of the water jacket. Further, the area ratio should be not more than 30% otherwise engine performance is lowered and operated engine becomes noisy.

Figure 6:
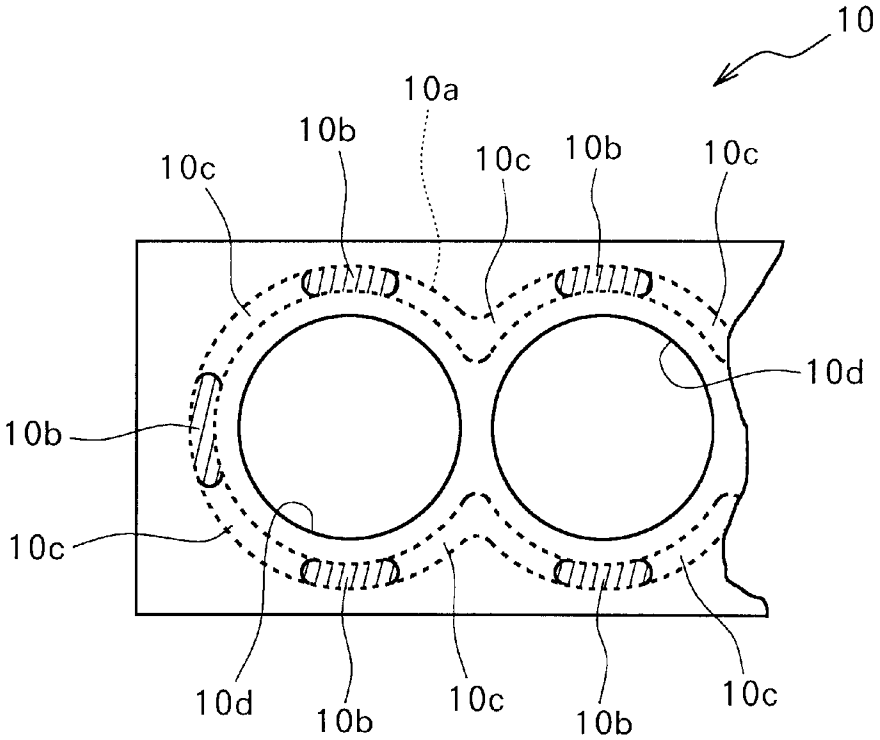
FIG. 6 is a plan view showing a part of the closed deck type cylinder block according to the embodiment of the present invention.

Upon completion of casting, the waste sand is removed from the water jacket through the opening by shaking. If necessary, additional heat treatment may be performed. Thus, the closed deck type V6 cylinder block having the opening area ratio of from 10 to 30% of the projection area of the water jacket at the top deck side can be provided. FIG. 6 shows the closed deck type cylinder block 10 as viewed from the top deck side. The parallel broken lines indicate the water jacket 10*a* surrounding the cylinders 10*d*, and correspond to the projection area of the water jacket at the top deck side. The hatching lines indicate the openings 10*b*, and portions other than the hatching lines and within the broken lines indicate the bridge portions 10*c*.

Next, several examples will be described. However, the present invention is not limited to the depicted examples. Bending strength was measured with respect to various examples of the mold material. Further, waste sand discharging performance was evaluated with respect to various V6 cylinder block formed of aluminum alloy and produced by the above described die-casting machine. The evaluation was made in accordance with the conditions and results shown in Table 2.

Production of powdered polyfunctional acrylamide will first be described. Into a reaction vessel with a kneaded type were put 218 kg of N-methylolacrylamide, 61 kg of acrylamide, 15 kg of 92 wt % of paraformaldehyde, 2. 8 kg of oxalic acid and 10 kg of hydroquinone, and these were agitated together. The reaction vessel was decompressed and air was blown into the vessel and was heated to the temperature of 70° C. This elevated temperature was maintained for 6 hours for aging reaction while removing generated water by distillation. As a result, powdered polyfunctional acrylamide (a mixture mainly composed of oxydimethylenebisacrylamide and methylenebisacrylamide) was synthesized.

EXAMPLE 1

Into a wirlmixer, supplied by Enshu Tekko. were put 200 kg of Unimin 90 sand (silica sand, registered trade mark, supplied by Unimin in USA.), 5.8 kg of curable binder containing 1.8 kg of the polyfunctional acrylamide synthesized by the above described method and 4.0 kg of 45 wt % of unsaturated polyester resin methyl chloride solution, 0.07 kg of 60 wt % of cumenehydroperoxide solution (polymerization accelerator, and hereinafter simply referred to as "KHP"), 0.03 kg of vinyl silane coupling A-172 (Trade name, a product supplied by Nippon Unica.) and 1.8 kg of iron oxide. These were mulled for 300 seconds, and then 0.4 kg of calcium stearate was added and mixed for 30 seconds to provide a mold material having a good free flowability. Bending strength was measured with respect to a test piece formed of the mold material. The test piece was molded into a predetermined shape defined by JIS K-6910. The test piece provided the bending strength of 600N/cm$^2$.

Next, the mold material was subjected to a top-blow molding at the blowing pressure of 0.41 Mpa for 5 seconds into a core mold heated at the temperature of about 250 to 300° C., and was cured for 60 seconds. Thus, the water jacket core shown in FIG. 1 was produced. Total weight of the two water jacket cores was about 1900 g.

The thus molded water jacket core was subjected to coating in a manner described with reference to Table 1 above, and the coated water jacket core was employed in a laminar flow die-casting method (casting pressure of 51 MPa with the plunger speed of 0.16 m/s), whereby aluminum alloy cylinder block having the opening area ratio of 20% was produced. After cooling, the casted cylinder block was separated from the unwanted solidified metal at a gate portion, and the cylinder block was held on a pneumatic shaking machine to perform shaking with the shaking pressure of 0.5 MPa for 60 seconds. As a result of the shaking, no waste sand remained in the water jacket.

EXAMPLE 2

Example 2 employed the curable binders the same as that of Example 1. However, in contrast to Example 1, iron oxide and copper oxide were added as an agent for reducing tar in Example 2. Materials for the water jacket core were prepared in a manner the same as Example 1. Then, bending strength was measured with respect to the test piece made from the mold material in a manner the same as Example 1, The test result is shown in Table 2. Next the water jacket core was molded, and then after coating the molded water jacket core, die-casting the block was performed in a manner similar to Example 1. As a result of shaking, no residual waste sand was found in the cylinder block formed of aluminum alloy and having opening area ratio of 20%.

Comparative Example 1

200 kg of the Unimin 90 preheated at about 150° C. and 3 kg of novolac type phenol resin were put into the wirlmixer supplied by Enshu Tekko. These were subjected to mulling for 60 seconds, and then, 3.45 kg of aqueous solution of hexamine (a mixture of 0.45 kg of hexamethylenetetramine and 3 kg of water) was added to the mulling. A mulling mass was collapsed by the application of cooling air, and then the air blow was stopped. Then, 0.2 kg of calcium stearate was added and mixed for 15 seconds to provide a mold material imparted with good free flowability. Next, bending strength was measured with respect to the test piece formed from the mold material in a manner the same as Example 1. The test result is shown in Table 2. Next the water jacket core was molded, and then after coating the molded water jacket core, die-casting the block was performed in a manner similar to Example 1. The resultant cylinder block had an opening area ratio of 30%. Discharge of the waste sand from the cylinder block did not occur only by the shaking. Then, the cylinder block was further heated at 490° C. in a heat circulation furnace for 5 hours, and thereafter was cooled and shaked. As a result, all waste sand can be discharged from the cylinder block.

Comparative Example 2

A mold material in Comparative Example 2 was almost the same as the material in Example 1 except that the amount of the curable binder was different from that in Example 1, and iron oxide as the agent for reducing tar was not added. In a manner similar to Example 1, the mold material was prepared, and bending strength was tested to the test piece made from the mold material. The test result is shown in Table 2. Next, after coating the water jacket core, die-casting the block was performed in a manner similar to Example 1. As a result of shaking, almost 50% of waste sand remained in the cylinder block. Next, the cylinder block was further heated at 490° C. in a heat circulation furnace for 1 hour, and thereafter was cooled and shaked. As a result, waste sand was completely discharged from the cylinder block.

Comparative Example 1, or if thermally decomposable poly-functional acrylamide was used as the requisite component of the curable binder in case of Comparative Example 2, the waste sand could not be completely removed from the cylinder block only by the shaking, and additional heat treatment (heat treatment to the casted product containing the core) was required for the complete removal of the residual sand.

On the other hand, if the polyfunctional acrylamide binder and iron oxide and/or copper oxide were co-used for the material of the water jacket core in case of Examples 1 and 2, the waste sand was completely removed only by the shaking from the cylinder block having opening area ratio of 20%. Because only the shaking process is performed after casting process, entire processing period can be shortened and enhanced productivity can result.

While the invention has been described in detail and with reference to the specific embodiments thereof, it would be apparent to those skilled in the art that various changes and modifications may be made therein without departing from the spirit and scope of the invention.

What is claimed is:

1. A method for producing a closed deck cylinder block having a top deck surface and formed with a plurality of cylinders juxtaposedly arranged to each other and a water jacket portion surrounding the plurality of cylinders, the water jacket portion having an opening opened at the top deck surface of the cylinder block, and the opening being partly closed by bridge portions, the opening having an area ratio of from 10 to 30% of a projection area of the water jacket portion at the top deck surface, the method comprising the steps of:

TABLE 2

| COMPONENT | | | COMPARATIVE EXAMPLE 1 | COMPARATIVE EXAMPLE 2 | EXAMPLE 1 | EXAMPLE 2 |
|---|---|---|---|---|---|---|
| CORE PRODUCTION | CORE MATERIAL | REFRACTORY AGGREGATE | UNIMIN | UNIMIN | UNIMIN | UNIMIN |
| | | CURABLE ORGANIC BINDER | NOVOLAC PHENOL RESIN | POLYFUNCTIONAL ACRYLAMIDE + DIARYLPHTHALATE RESIN | | |
| | | AMOUNT (WEIGHT %/ REFRACTORY AGGREGATE) | 1.5 | 1.5 | 1.8 | 1.8 |
| | | METAL OXIDE KIND | NONE | NONE | ION OXIDE | ION OXIDE/ COPPER OXIDE |
| | | AMOUNT (WEIGHT %/ BINDER) | | | 50 | 50 |
| | | BENDING STRENGTH ($N/cm^2$) | 670 | 680 | 600 | 640 |
| | COATING | | YES | YES | YES | YES |
| DIE-CASTING CONDITION | PRESSURE (MPa) | | 51 | 51 | 51 | 51 |
| | INJECTION SPEED (m/s) | | 0.16 | 0.16 | 0.16 | 0.16 |
| CASTING RESULT | OPENING RATIO (%) AT TOP DECK | | 30 | 30 | 20 | 20 |
| | WASTE SAND DISCHARGE METHOD | | SHAKING + HEATING (490° C. × 5 hr) | SHAKING + HEATING (490° C. × 5 hr) | SHADING | SHADING |
| | REMAINING RATIO OF WASTE SAND IN PRODUCT (%) | | 0 | 0 | 0 | 0 |

As is apparent from Table 2, if thermally antidecomposed phenol resin was used as the curable binder in case of molding a water jacket core, so as to provide the opening having the area ratio of from 10 to 30% of the projection area of the water jacket portion at the top deck surface, with a mold material in a free flowability comprising a refractory aggregate, a curable organic binder containing as a requisite component polyfunctional acrylamide having at least two ethylenically unsaturated groups in one molecule, and at least one metal oxide selected from the group consisting of iron oxide and copper oxide;

forming a coating layer over the molded water jacket core;

setting the coated water jacket core in a metal mold and injecting a molten metal into the metal mold to produce a cylinder block product by die-casting; and discharging waste sand converted from the water jacket core from the cylinder block product only by shaking the cylinder block product.

2. The method as claimed in claim 1, wherein at least 10 wt % of the polyfunctional acrylamide is contained in the curable organic binder.

3. The method as claimed in claim 2, wherein from 30 to 90 wt % of the polyfunctional acrylamide is contained in the curable organic binder.

4. The method as claimed in claim 3, wherein from 40 to 80 wt % of the polyfunctional acrylamide is contain in the curable organic binder.

5. The method as claimed in claim 1, wherein the polyfunctional acrylamide is a material selected from the group consisting of methylenebisacrylamide, ethylenebisacylamide, methylenebismethacrylamide, oxydimethylenebisacryl amide, and ethylenedioxybis-N-methyleneacrylamide.

6. The method as claimed in claim 1, wherein not less than 10 parts by weight of the metal oxide is contained with respect to 100 parts by weight of the polyfunctional acrylamide binder.

7. The method as claimed in claim 6, wherein from 30 to 70 parts by weight of the metal oxide is contained with respect to 100 parts by weight of the polyfunctional acrylamide binder.

8. The method as claimed in claim 1, wherein the coating layer comprises a first coating layer formed over the molded water jacket core and containing aqueous urea resin, and a second coating layer formed over the first coating layer and containing flaky pieces, the aqueous urea resin being penetrated into the second coating layer to form a diffusion layer to ensure tight bonding between the first and second coating layers, and the flaky pieces avoiding penetration of the molten metal into the water jacket core.

9. The method as claimed in claim 1, wherein in the die-casting step, the molten metal is filled in a metal mold including a slide core, and wherein the slide core has an abutting surface in confrontation with a front end face of the water jacket core, and the abutting surface is formed with a plurality of recesses, the abutting surface defined between the neighboring recesses serving as front end abutting surface in intimate contact with the front end face, and the bridge portions being provided upon filling the molten metal in the plurality of recesses.

* * * * *